United States Patent [19]

Harmer

[11] Patent Number: 4,842,104

[45] Date of Patent: Jun. 27, 1989

[54] INTERNAL SHOE DRUM BRAKE

[75] Inventor: George A. Harmer, Solihull, England

[73] Assignee: Lucas Industries public limited company, Birmingham, England

[21] Appl. No.: 675,750

[22] Filed: Nov. 28, 1984

[30] Foreign Application Priority Data

Dec. 9, 1983 [GB] United Kingdom ............... 8332878

[51] Int. Cl.$^4$ ..................... F16D 51/16; F16D 65/22
[52] U.S. Cl. ........................... 188/79.51; 188/79.64; 188/79.57
[58] Field of Search ............... 188/79.5 R, 79.5 GT, 188/79.5 GC, 79.5 P, 340, 325, 216, 382, 79.63, 79.51, 79.57, 79.64

[56] References Cited

U.S. PATENT DOCUMENTS

| | | | |
|---|---|---|---|
| 2,228,576 | 1/1941 | Marino | 188/79.5 GT |
| 3,294,202 | 12/1966 | Helvern | 188/79.5 GC |
| 3,400,787 | 9/1968 | Keller et al. | 188/79.5 GT |
| 3,572,476 | 3/1971 | Laverdant | 188/216 |
| 3,589,476 | 6/1971 | Evans | 188/79.5 GC |
| 3,858,463 | 1/1975 | Klavonich | 188/79.5 GC |
| 3,869,026 | 3/1975 | Williams | 188/79.5 GT |
| 4,228,876 | 10/1980 | Osborne | 188/79.5 GT |

FOREIGN PATENT DOCUMENTS

| | | | |
|---|---|---|---|
| 2419431 | 10/1979 | France . | |
| 0006735 | 1/1982 | Japan | 188/79.5 R |
| 0045382 | 12/1986 | Japan . | |
| 1247245 | 9/1971 | United Kingdom | 188/79.5 R |

Primary Examiner—Donald J. Yusko
Assistant Examiner—Alvin Oberley
Attorney, Agent, or Firm—Holman & Stern

[57] ABSTRACT

An internal shoe drum brake has a pair of shoes (1, 2) mounted on a backplate (3), and a mechanical shoe-expansion mechanism which includes a lever (9) movable angularly in a plane parallel to the backplate, an abutment device (13) mounted on the shoe (2) and retained on the shoe by a separate shoe hold-down device (14), the abutment device extending to a position adjacent the lever to provide a backstop for the latter in order to set a predetermined retracted position for the lever.

9 Claims, 2 Drawing Sheets

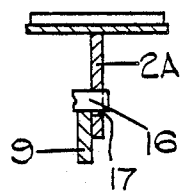
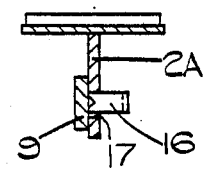
FIG.3A.  FIG.3B.
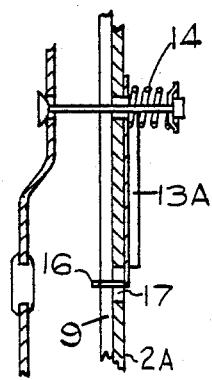
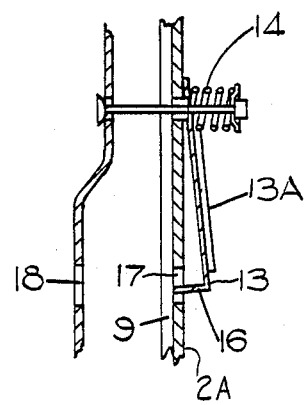
FIG.4A.  FIG.4B.

INTERNAL SHOE DRUM BRAKE

BACKGROUND OF THE INVENTION

1. Field of the Invention

This invention relates to an internal shoe drum brake, primarily for motor vehicles, and having a pair of brake shoes mounted on a backplate and arranged for expansion by a mechanism which includes a lever movable angularly in a plane generally parallel to the backplate.

2. Description of the Prior Art

It is common for the drum of such a brake to become grooved by one or both of the shoes after long service and it can become difficult to remove the drum in such circumstances, particularly when the brake includes an automatic adjuster for maintaining the shoe to drum clearance at a predetermined maximum value. In order to overcome this problem, such brakes are often provided with a releasable backstop carried by the backplate, and arranged so as normally to prevent the actuating lever from moving, in the brake release direction, beyond a predetermined retracted position, but, upon release, to permit the lever to move in the brake release direction to a second retracted position, thereby enabling the shoes to move inwardly to clear the drum groove. The drum may then readily be removed for servicing of the brake, for example.

Some examples of releasable backstops are described in our earlier British Patent No. 1247245, these being essentially in the nature of inserts placed in openings in the backplate and capable of manipulation to enable the lever to move from its normal retracted position to the second retracted position, when desired. These arrangements are satisfactory, provided that the backplate profile has sufficient depth to permit the backstop to be placed at a sufficiently steep angle to the plane of the backplate to provide a reliable stop. With some modern shallow backplate designs, these conditions cease to apply and the aforesaid type of backstop becomes unsatisfactory.

In another known arrangement, a resilient shoe holddown device is provided with a projecting arm which extends to a position behind the plane of the shoe web to provide a backstop for the actuating lever. This can be satisfactory in some light-duty applications, but is not ideal for use in brakes intended for large saloon cars and light vans for example in which considerable shoe holddown forces are required and hold down devices such as coil springs are then often preferred.

BRIEF SUMMARY OF THE INVENTION

According to the invention, an internal shoe drum brake comprises a pair of brake shoes mounted on a backplate and arranged for expansion by a mechanism which includes a lever movable angularly in a plane generally parallel to the backplate, and an abutment device mounted on one of the shoes and retained thereon by a separate shoe hold down device associated with that shoe, the abutment device extending to a position adjacent the lever to provide a backstop for the latter in order to set a predetermined retracted position for the lever.

In one convenient arrangement, the device is in the form of an elongate plate which lies against the web of the shoe and is provided with a projection out of the plane of the plate which engages an edge surface portion of the web to form the backstop.

Preferably, the projection extends through an opening in the shoe web to provide the backstop at the opposite side of the web to that on which the device is mounted, and engages an inner edge surface of the opening which constitutes the web edge surface portion.

The arrangement is preferably such that the backstop is disposed opposite to an opening in the backplate through which the abutment device may be moved so as to remove the backstop from the plane of movement of the lever, thereby permitting the latter to move to a further retracted position such that the shoes are able to move away from the drum.

The invention will now be described, by way of example, with reference to the accompanying drawings wherein:

FIGS. 3A and 3B are detail cross-sectional views taken along line B—B of FIG. 1; and FIGS. 4A and 4B are views similar to FIG. 2 illustrating part of an alternative embodiment of the invention.

DETAILED DESCRIPTION

Figure 1:
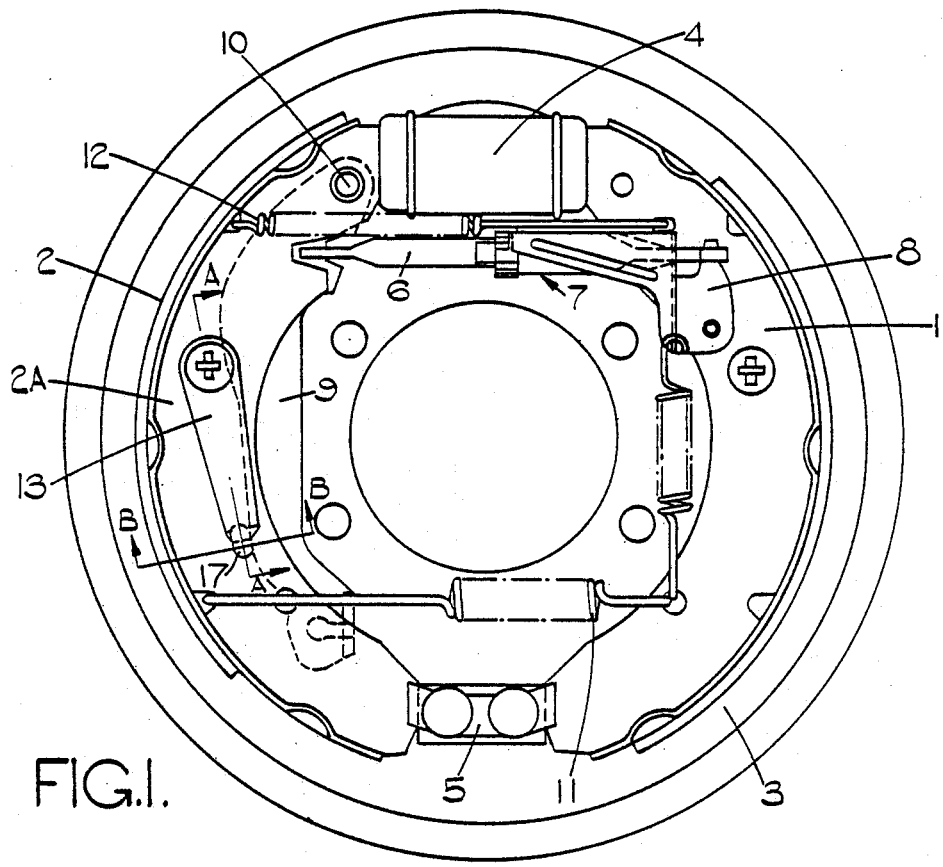
FIG. 1 is an end elevation of one form of the internal shoe drum brake of the invention.

Referring to FIG. 1 of the drawings, this shows an internal shoe drum brake having a pair of brake shoes 1, 2 mounted on a backplate 3, with one pair of adjacent shoe ends engaged by an hydraulic actuating cylinder 4 and the other pair engaging a fixed abutment 5. A strut 6 extends between the shoes and incorporates part of an automatic adjustment device indicated generally at 7, one end of the strut engaging a shoe-mounted lever 8 of the device 7 and the other end engaging a mechanical actuator lever 9 which has one of its ends pivotally mounted at 10 on the shoe 2, the other end being adapted for the connection thereto of an operating rod or cable. Shoe return springs 11, 12 urge the shoes inwardly to bring the shoe 1 and the lever 9 mounted on the shoe 2 into firm engagement with the strut, the length of which sets the normal retracted positions of the shoes.

Figures 2A, 2B:
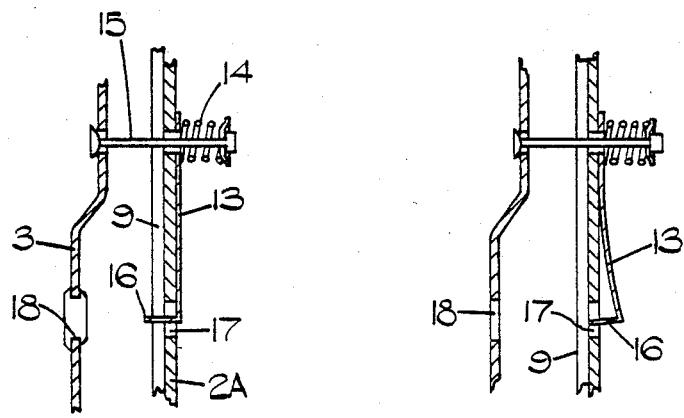
FIGS. 2A and 2B are detail cross-sectional views taken along line A—A of FIG. 1 showing a component in alternative operative positions.

The backstop is provided, in this embodiment by a thin flexible blade-like lever 13 which lies against the web 2A and is held in position by a coil spring 14 of a conventional shoe hold down assembly, of which a rod 15 passes through the lever 13 and web 2A to engage the backplate 3 (FIG. 2A). An end portion of the lever is bent out of the plane of the latter to form a tongue 16 which extends through a hole 17 in the web 2A across the plane of movement of the actuator lever 9 so that a lateral edge of the tongue is engaged by the lever 9 and provides a backstop for the latter. Since the lever 9 is pivotally mounted on the shoe 2 and abuts the strut, the return spring force creates a movement tending to rotate the lever outwardly, such outward movement being limited by the backstop. The various components are arranged so that the backstop sets a normal retracted position of the lever 9 which is suitable for normal brake operation and is somewhat further away from the drum than would be the case if the action of the shoe return springs on the lever were not restrained by the backstop.

When it is desired to remove the brake drum, it may be necessary, because of drum grooving, to retract the shoes further, and this may be achieved by passing a suitable implement through an opening 18 in the backplate located opposite to the tongue 16 and pushing on the tongue, so that it flexes back to the position shown in FIGS. 2B and 3B in which it is clear of the plane of movement of the lever 9, thereby enabling the latter to move further towards the drum under the action of the shoe return springs and consequently permitting said springs to effect further retraction of the shoes away from the drum. The opening 18 through which this manipulation is carried out is conveniently one which is normally provided for the purpose of inspecting the condition of the shoe linings without first removing the drum.

In the alternative embodiment illustrated in FIGS. 4A and 4B, the lever 13 is rigid, being in the form of an open channel having upstanding sides 13A. The physical arrangement of the lever 13 is identical to that described above, but since the lever is rigid, it requires resilient displacement of the hold down spring 14 in order to be able to reach the release position shown in FIG. 4B.

During initial assembly of the brake, it is necessary to adjust the length of the usual actuating cable (not shown), which connects the lever 9 to a driver-operated handbrake lever in the vehicle on which the brake is used, so that the lever rests firmly against the backstop with substantially no slack in the cable. This may be achieved in the brake of the invention by placing the lever 9 directly behind the backstop so that the latter is displaced outwardly, either against the inherent resilience of the blade 13 (FIG. 2B) and/or by deforming the hold-down spring 14 (FIG. 4B). The actuating cable is then adjusted to move the lever 9 inwardly until the backstop is able to snap into place behind the outermost edge of the lever. This action produces a readily audible "click" indicating that the lever is then in its correct position.

The invention will be seen to provide a simple backstop arrangement for an actuator lever in a shoe drum brake employing separate shoe hold-down springs, is cheap to produce and reliable in operation.

I claim:

1. An internal shoe drum brake comprising:
   a pair of brake shoes mounted on a backplate, each brake shoe having a web portion; and
   a mechanism operatively associated with said brake shoes for expanding said brake shoes comprising,
   a lever mounted on one of said brake shoes for angular movement in a plane generally parallel to said backplate,
   an edge on said lever,
   an elongated abutment plate lying against one side of the web portion of said one brake shoe,
   a hold-down device operatively associated with said one brake shoe and abutment plate for mounting and retaining said abutment plate on said one brake shoe,
   an edge surface portion on the web portion of said one brake shoe,
   a projection extending from said abutment plate out of the plane thereof in a plane substantially perpendicular to said web portion of said one brake shoe to a position adjacent said lever substantially perpendicular to said edge on said lever and engaging said edge surface portion on said web portion to form a backstop for said lever to set a predetermined retracted position for said lever,
   a lateral edge portion on said projection, and
   a continuous edge surface extending along substantially the entire length of at least one side of said abutment plate and including said lateral edge portion on said projection, said lateral edge portion on said projection extending in a plane substantially perpendicular to said projection and being engageable with said edge on said lever when in said retracted position.

2. A shoe drum brake as claimed in claim 1 wherein said hold-down device comprises:
   an axially extending rod passing through the web portion of said one brake shoe; and
   a coil spring urged against said abutment plate by said rod.

3. A shoe drum brake as claimed in claim wherein:
   said abutment plate comprises a resiliently deformable blade which is movable away from said backstop position to disengage said lateral edge portion on said projection from said edge on said lever so that said lever is allowed to move to a further retracted position to enable the brake shoes to move away from the drum.

4. A shoe drum brake as claimed in claim wherein:
   said hold-down device comprises means for applying a resilient force to said abutment plate; and
   said abutment plate is substantially rigid and is movable against said resilient force of said hold-down device so that said projection is movable away from said backstop position to disengage said lateral edge portion from said edge on said lever and allow said lever to move to a further retracted position to enable the brake shoes to move away from the drum.

5. An internal shoe drum brake comprising:
   a pair of brake shoes mounted on a backplate;
   a web portion on each brake shoe;
   an edge surface portion on the web portion of one of said brake shoes; and
   a brake shoe expanding mechanism comprising,
   a mechanical actuator lever operatively connected to said brake shoes for angular movement in a plane generally parallel to the backplate for expanding said brake shoes into braking engagement with the drum,
   an edge on said lever,
   an elongated abutment plate mounted on one of said brake shoes in a position to lie against said web portion of said one brake shoe,
   a projection extending from said abutment plate out of the plane of said abutment plate in a plane substantially perpendicular to said web portion of said one brake shoe and substantially perpendicular to said edge on said lever,
   a lateral edge portion on said projection,
   a continuous edge surface extending along substantially the entire length of at least one side of said abutment plate and including said lateral edge portion on said projection, said lateral edge portion on said projection extending in a plane substantially perpendicular to said projection and being engageable with said edge on said lever and said edge surface portion to provide a backstop for said lever in the engaged position to set predetermined retracted position for said lever, and
   a separate hold-down device operatively associated with said one brake shoe and said abutment plate for mounting and retaining said abutment plate on said one brake shoe.

6. An internal shoe drum brake comprising:
a pair of brake shoes mounted on a backplate, each shoe having a shoe web; and
a brake shoe expanding mechanism comprising,
a mechanical actuator lever operable by remote control and operatively connected to said brake shoes for angular movement in a plane generally parallel to the backplate for expanding said brake shoes into braking engagement with the drum,
an edge on said lever,
an abutment device mounted on one of said brake shoes having a plate-like portion on one side of the shoe web of said one brake shoe,
a projection extending from said plate-like portion in a plane substantially perpendicular to said shoe web of said one brake shoe to a position on the other side of said shoe web of said one brake shoe adjacent said lever and substantially perpendicular to said edge on said lever,
a lateral edge portion on said projection,
a continuous edge surface extending along substantially the entire length of at least one side of said plate-like portion and including said lateral edge portion on said projection, said lateral edge portion on said projection extending in a plane substantially perpendicular to said projection and being engageable by said edge on said lever to provide a backstop for setting a predetermined retracted position for said lever, and
a retaining device operatively associated with said one brake shoe, said abutment device and backplate for mounting and retaining said abutment device on said one brake shoe and holding down said one brake shoe with respect to the backplate.

7. A shoe drum brake as claimed in claim 6 wherein:
said retaining device comprises,
an axially extending rod passing through the web of said one brake shoe, and
a coil spring connected to said abutment device by said rod.

8. A shoe drum brake as claimed in claim 6 wherein:
said abutment device comprises a flexible resiliently deformable blade which is movable away from said backstop to disengage said lateral edge on said projection from said edge on said lever position so that said lever is allowed to move to a further retracted position to enable the brake shoes to move away from the drum.

9. A shoe drum brake as claimed in claim 6 wherein:
said retaining device comprises means for applying a resilient force to said abutment device; and
said abutment device is substantially rigid and is movable against said resilient force of said retaining device away from said backstop position for disengaging said abutment device from said lever to allow said lever to move to a further retracted position to enable the brake shoes to move away from the drum.

10. An internal shoe drum brake comprising:
a pair of brake shoes mounted on a backplate, each brake shoe having a web portion; and
a mechanism operatively associated with said brake shoes for expanding said brake shoes comprising,
a lever mounted on one of said brake shoes for angular movement in a plane generally parallel to said backplate,
an edge on said lever,
an elongated abutment plate lying against one side of the web portion of said on brake shoe,
a hold-down device operatively associated with said one brake shoe and abutment plate for mounting and retaining said abutment plate on said one brake shoe,
a projection extending from said abutment plate out of the plane thereof in a plane substantially perpendicular to said web portion to a position adjacent said lever and substantially perpendicular to said edge on said lever and engaging said edge surface portion on said web portion of said one brake shoe to form a backstop for said lever to set a perdetermined retracted position for said lever,
a lateral edge portion on said projection engageable with said edge on said lever when in said retracted position; and
an opening in the web portion of said one brake shoe through which said projection is movable from said backstop position out of the plane of movement of said lever to allow said lever to move to a further retracted position to enable the brake shoes to move away from the drum.

11. An internal shoe drum brake comprising:
a pair of brake shoes mounted on a backplate;
a web portion on each brake shoe;
a edge surface portion on the web portion of one of said brake shoes; and
a brake shoe expanding mechanism comprising,
a mechanical actuator lever operatively connected to said brake shoes for angular movement in a plane generally parallel to the backplate for expanding said brake shoes into braking engagement with the drum,
an edge on said lever,
an elongated abutment plate mounted on one of said brake shoes in a position to lie against said web portion of said one of said brake shoes,
a projection extending from said abutment plate out of the plane of said abutment plate in a plane substantially perpendicular to said web portion of said said of of said brake shoes and substantially perpendicular to said edge on said lever,
lateral edge means on said projection engageable with said edge on said lever and said edge surface portion to provide a backstop for said lever in the engaged position to set a predetermined retracted position for said lever,
a separate hold-down device operatively associated with said one brake shoe and said abutment plate for mounting and retaining said abutment plate on said one brake shoe; and
an opening in the web portion of said one brake shoe having an inner edge surface comprising said edge surface portion on said web portion, said projection extending through said opening and engaging said inner edge surface to provide said backstop at the side of said web portion opposite to the side of said web portion on which said abutment plate is mounted.

12. An internal shoe drum brake comprising:
a pair of brake shoes mounted on a backplate;
a web portion on each brake shoe;
an edge surface portion on the web portion of one of said brake shoes; and
a brake shoe expanding mechanism comprising,
a mechanical actuator lever operatively connected to said brake shoes for angular movement in a plane generally parallel to the backplate for expanding said brake shoes into braking engagement with the drum, an edge on said lever, an elongated abutment plate mounted on one of said brake shoes in a position to lie against said web portion of said one of said brake shoes, a projection extending from said abutment plate out of the plane of said abutment plate in a plane substantially perpendicular to said web portion of said one of said brake shoes and substantially perpendicular to said edge on said lever, lateral edge means on said projection engageable with said edge on said lever and said edge surface portion to provide a backstop for said lever in the engaged position to set a predetermined retracted position for said lever, a separate hold-down device operatively associated with said one brake shoe and said abutment plate for mounting and retaining said abutment plate on said one brake shoe, and an opening in the web portion of said one of said brake shoes through which said projection is movable so that said projection can be moved from said backstop position out of the plane of movement of said lever to allow said lever to move to a further retracted position to enable the brake shoes to move away from the drum.

13. An internal shoe drum brake comprising:

a pair of brake shoes mounted on a backplate, each brake shoe having a web portion; and a mechanism operatively associated with said brake shoes for expanding said brake shoes comprising, a lever mounted on one of said brake shoes for angular movement in a plane generally parallel to said backplate, an edge on said lever, an elongated abutment plate lying against one side of the web portion of said one brake shoe, a hold-down device operatively associated with said one brake shoe abutment plate for mounting and retaining said abutment plate on said one brake shoe, a projection extending from said abutment plate out of the plane thereof in a plane substantially perpendicular to said web portion to a position adjacent said lever and substantially perpendicular to said edge on said lever and engaging said edge surface portion on said web portion of said one brake shoe to form a backstop for said lever to set a predetermined retracted position for said lever, and a lateral edge portion on said projection engageable with said edge on said lever when in said retracted position; and an opening in the web portion of said one brake shoe having an inner edge surface comprising said edge surface portion of said web, said projection extending through said opening and engaging said inner edge surface to provide said backstop at the side of said web opposite to the side of said web portion on which said abutment plate is mounted.

* * * * *